Oct. 13, 1931.    J. E. BATTS    1,826,703
POWER TRANSMISSION GEARING
Filed Oct. 18, 1928    2 Sheets-Sheet 1
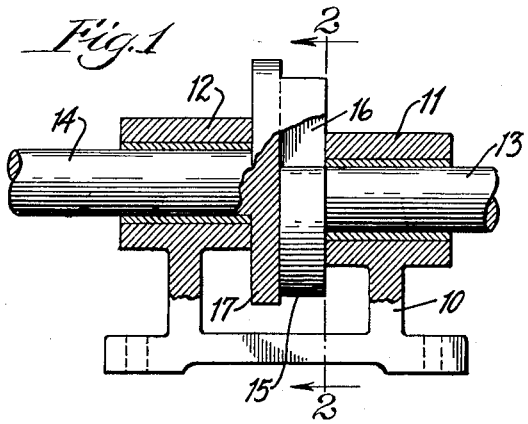
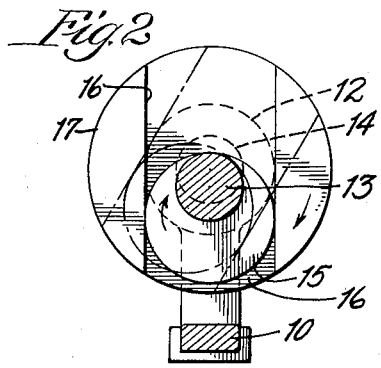
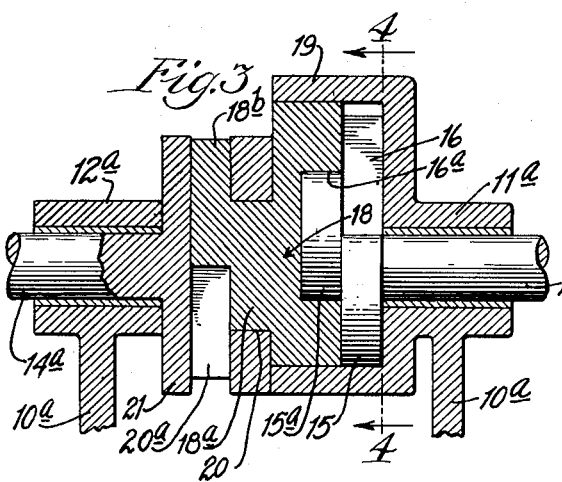
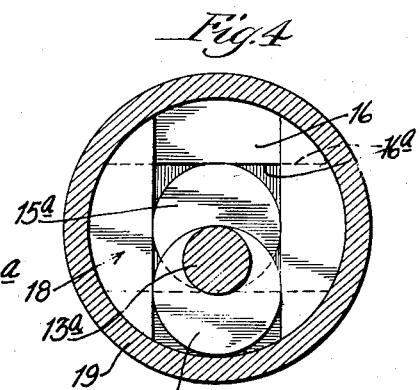
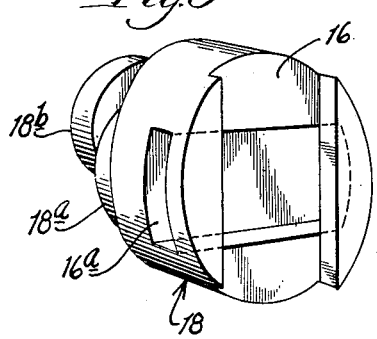
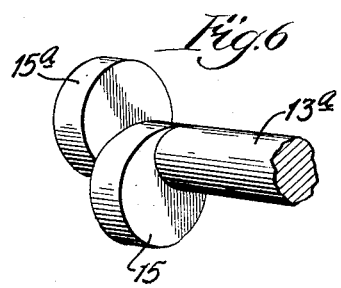
Inventor:
John E. Batts,
By Charles O. Sherry
Attys.

Oct. 13, 1931. J. E. BATTS 1,826,703
POWER TRANSMISSION GEARING
Filed Oct. 18, 1928 2 Sheets-Sheet 2
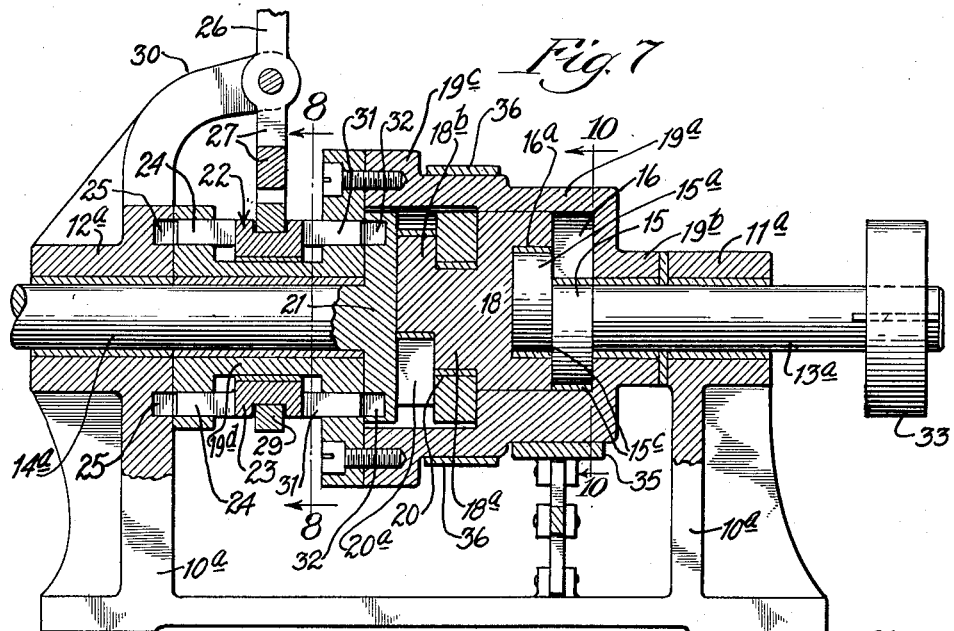
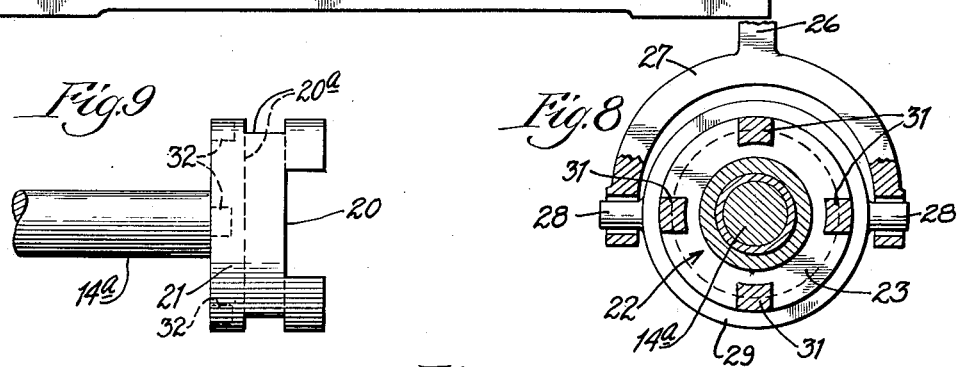
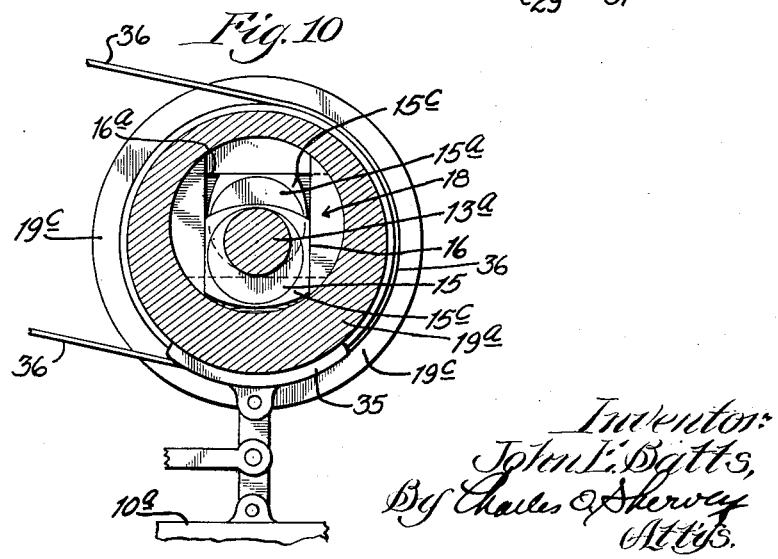

Patented Oct. 13, 1931

1,826,703

UNITED STATES PATENT OFFICE

JOHN E. BATTS, OF CHICAGO, ILLINOIS

POWER TRANSMISSION GEARING

Application filed October 18, 1928. Serial No. 313,209.

This invention relates to power transmission gearing, and its principal object is to provide a novel form of mechanism for transmitting power from a drive member to a driven member either at the same speed as that of the drive member or at a variable reduced or increased speed. Another object is to provide power transmission gearing wherein the speed of the driven shaft is reduced and the leverage thereof correspondingly increased. Another object is to provide power transmission gearing in which the speed of the driven shaft may be varied relative to the speed of the drive shaft and the leverage thereof correspondingly increased or decreased in proportion to the relative speed of the two shafts.

With these and other objects and advantages in view, this invention consists in a power transmission gearing of which the shaft, having the greater speed, is provided with one or more eccentric blocks rotating in one or more radially extending slideways provided upon the driven shaft or upon an intermediate power transmitting member, whereby the speed of the driven shaft is reduced and the leverage increased relative to that of the drive shaft. It further consists in power transmission gearing wherein the intermediate power transmission member is journaled on an axis eccentric with respect to the axis of the drive shaft and driven shaft. The invention further consists in the provision of a journal bearing for said eccentrically disposed intermediate power transmission member and means for holding said journal bearing in a fixed position against rotation and for permitting rotation thereof and for fixedly coupling or connecting said journal bearing with one of the rotating members of the gearing, whereby a direct drive may be obtained between the drive shaft and driven shaft.

The invention further consists in the several novel features hereinafter fully set forth and claimed.

The invention is clearly illustrated in the drawings accompanying this specification in which—

Figure 1 is a view partly in side elevation and partly in central vertical longitudinal section illustrating a simple embodiment of the principle upon which the present invention depends;

Fig. 2 is a vertical cross section taken on the line 2—2 of Fig. 1;

Fig. 3 is a central vertical longitudinal section through a second form of the invention;

Fig. 4 is a detail vertical cross section taken on the line 4—4 of Fig. 3;

Fig. 5 is a persepctive view of the intermediate power transmission member;

Fig. 6 is a perspective view of a fragment of the drive shaft showing the eccentric blocks thereon;

Fig. 7 is a view partly in side elevation and partly in central vertical longitudinal section illustrating a third embodiment of the present invention;

Fig. 8 is a detail vertical cross section taken on the line 8—8 of Fig. 7;

Fig. 9 is a side elevation of a fragment of the driven shaft; and

Fig. 10 is a detail vertical cross section taken on the line 10—10 of Fig. 7.

Referring to said drawings, and first to Figs. 1 and 2, which are merely illustrative of the principle upon which the present invention depends, the reference character 10 designates a supporting frame having two journal bearings 11 and 12 in which are journaled a drive shaft 13 and a driven shaft 14. The two shafts are non-concentric with respect to each other and the drive shaft is provided with an eccentric block 15, the axis of which is eccentrically disposed with respect to the axis of the drive shaft and runs in a radially extending slideway 16 formed in a head or cylindrical member 17 rigidly mounted upon or formed as a part of the driven shaft 14.

In the form of the invention illustrated in Figs. 1 and 2, when the drive shaft 13 is rotated, the eccentric block 15 is rotated therewith and the circumferential face thereof bears against one of the side faces of the slideway 16 (having somewhat the nature of a wedge-like action thereon), and thereby rotates the head 17 upon the axis of the driven shaft 14 at one-half the speed of the drive shaft and consequently at twice the leverage thereof. The simple form of the invention illustrated in Figs. 1 and 2 is primarily intended to illustrate the transmission of power from a drive shaft to a driven shaft with the use of an eccentric block on the drive shaft running in a radially extending slideway provided on the driven shaft.

Referring now to Figs. 3 to 6, inclusive, the supporting frame is seen at $10^a$ and is provided with journal bearings $11^a$ and $12^a$ in which are journaled the drive shaft $13^a$ and driven shaft $14^a$. In this form of the invention, the shafts are concentric with each other, that is, they are in co-axial alignment, and the power transmission gearing shown in connection with said aligned shafts serves to reduce the speed of the driven shaft to one-fourth of that of the drive shaft, with a corresponding increase in the leverage thereof.

Instead of employing only one eccentric block 15 on the drive shaft, two eccentric blocks 15 and $15^a$ are shown thereon, the axes of which are disposed on opposite sides of the axis of the shaft $13^a$. The eccentric blocks run in radially extending slideways 16 and $16^a$ that are formed in an intermediate power transmission member 18, which is in the form of a cylindrical block eccentrically disposed with respect to the common axis of the shafts $13^a$ and $14^a$ and is journaled in a journal bearing 19, here shown as being stationary, and rigidly connected to or formed as a part of the journal bearing for the drive shaft $13^a$. It is to be understood that the intermediate power transmission member 18 rotates in the journal bearing 19 on an axis eccentric with respect to the axis of the drive shaft and the driven shaft.

The slideways 16 and $16^a$ extend at right angles to each other, as shown in Fig. 5, and each is disposed out of the plane of the other, whereby each eccentric block 15 or $15^a$ may rotate in an associated slideway in the intermediate power transmission member. Moreover, the side bearing faces of the slideways, with which the eccentric blocks engage, are continuous throughout their extent, so that the circumferential faces of the eccentric blocks may continuously bear against the side faces of the slideways. It will be understood that when the drive shaft $13^a$ is rotated, the eccentric blocks 15 and $15^a$ will be bodily rotated therewith around the axis of the drive shaft, and because of the engagement of their circumferential faces with the side bearing faces of the slideways, the intermediate power transmission member will be rotated in the journal bearing 19 on an axis which is eccentric or non-eccentric with respect to the axis of the drive shaft, and, furthermore, that said intermediate power transmission member will be rotated at one-half the speed of the drive shaft and the leverage thereof is twice that of the drive shaft.

The intermediate power transmission member 18 is provided with one or more eccentric blocks $18^a$ and $18^b$, two being shown, the axes of which eccentric blocks are eccentric with respect to the axis of rotation of the intermediate power transmission member. The axis of the power transmission member extends through the eccentric blocks $18^a$ and $18^b$ thereof, whereby a shaft area is provided which is surrounded by the eccentric portions of the eccentric blocks $18^a$ and $18^b$, and this shaft area forms a shaft spur to all intents and purposes, which, together with the eccentric blocks thereon, are within the lateral bounds of slideways in which said eccentric blocks run. The eccentric blocks $18^a$ and $18^b$ run in radially extending slideways 20 and $20^a$ formed in a head or block 21 upon the end of the driven shaft $14^a$. Like the slide ways of the intermediate power transmission member, the slideways 20 and $20^a$ extend at right angles to each other and are offset with respect to each other so as to lie in two separate planes, whereby the eccentric blocks $18^a$ and $18^b$ may each run in an associated slideway, and whereby the side bearing face of each slideway may be continuous throughout its extent. It will be understood that when the intermediate power transmission member 18 is rotated upon its axis in the journal bearing 19, the eccentric blocks $18^a$ and $18^b$ will rotate the head 21 and therewith the driven shaft $14^a$ at one half the speed of the intermediate transmission member and at twice the leverage thereof.

The form of the invention shown in Figs. 3 to 6, inclusive, illustrates the application of the principle of this invention in connection with two aligned shafts wherein the speed of the driven shaft is reduced one-fourth of that of the drive shaft and at a corresponding increase in leverage. In Figs. 7 to 10, inclusive, means are shown for coupling the drive shaft with the driven shaft so that the two may rotate at equal speed, and for uncoupling the shafts, whereby the drive shaft may rotate idly, and means are shown for controlling the mechanism to obtain a variable reduction in speed of the driven shaft and the corresponding increase in leverage.

In the form of the invention illustrated in Figs. 7 to 10, the frame $10^a$ with the aligned journal bearings $11^a$ and $12^a$ for the aligned drive shaft $13^a$ and driven shaft $14^a$ are provided, as in the form illustrated in Fig. 3. Upon the drive shafts are the eccentric blocks 15 and $15^a$ which run in the slideways 16 and $16^a$ of the intermediate power transmission member 18 which is provided with the eccentric blocks $18^a$ and $18^b$ that run in the slideways 20 and $20^a$ of the head 21 upon the driven shaft $14^a$, substantially similar to the corresponding parts illustrated in Fig. 3, and operating in the same manner. In this form of the invention, the bushings $15^c$ are placed around the eccentric blocks, which bushings have flat side faces that run on the side faces of the slideways.

The journal bearing 19ª, which corresponds with the journal bearing 19 of the form illustrated in Fig. 3, has a hub 19ᵇ, here shown as rotatably mounted upon the drive shaft 13ª, whereby the journal portion 19ª may rotate upon the axis of said drive shaft. The journal portion 19ª is eccentrically disposed with respect to the axis of the drive shaft, as in the form illustrated in Fig. 3, whereby when the journal portion 19ª is held stationary, the drive shaft will rotate the intermediate power transmission member 18 at half the speed of the drive shaft with a corresponding increase in leverage. The journal bearing 19ª is formed with a cylindrical extension 19ᶜ which encloses the head 21, and to said extension 19ᶜ is rigidly secured a hub portion 19ᵈ which is journaled upon the driven shaft 14ᶜ. The cylindrical extension 19ᶜ of the journal bearing 19ª is eccentric with the axis of the drive shaft and driven shaft, and the cylindrical wall of the journal bearing portion is thickened to form a cylindrical outer face concentric with the axis of rotation of the journal bearing portion. By thickening the wall, on the one side, the weight is distributed more evenly throughout the journal bearing member, thereby affording a more perfect balance.

Suitable means are provided for releasably holding the journal bearing 19ª stationary, and said means is here shown to comprise clutch mechanism 22 which may be of any suitable or desired type, the one illustrated being in the form of a positively operating clutch comprising a clutch collar 23 slidably mounted on, but non-rotative with respect to, the hub 19ᵈ and having clutch teeth 24 thereon which are arranged to be thrown into notches 25 in the supporting frame to stop the rotation of the journal bearing 19ª. A clutch lever 26 is provided which has a fork 27 that engages with pins 28 on a ring 29 which is held in a circumferential groove formed in the clutch collar 23. The lever 26 is fulcrumed upon a supporting member 30 mounted on the supporting frame of the device.

It will be observed that by shifting the clutch so as to engage the clutch teeth 24 with the stationary supporting frame, the journal bearing 19ª is held stationary, whereby the mechanism may operate as has been described in connection with the form illustrated in Fig. 3. When the clutch collar is unclutched from the supporting frame and the journal bearing is, therefore, free to rotate upon the axis of the drive and driven shafts, the drive shaft will run idly and the journal bearing 19ª will run idly, but in the reverse direction, assuming, of course, that the driven shaft is held stationary.

For coupling the mechanism so as to obtain a direct drive between the drive shaft and driven shaft, the clutch collar 23 is arranged to couple together the journal bearing 19ª and the driven shaft 14ª, and in the form of clutch shown, the clutch collar 23 is provided with clutch pins 31 which are adapted to enter sockets 32 in the head 21 on the driven shaft 14. It will be observed, therefore, that when the clutch collar 23 is shifted to the right, as viewed in Fig. 7, the journal bearing 19ª and driven shaft 14ª will be clutched together, and the clutch unclutched from the supporting frame, whereby the journal bearing 19ª is free to rotate with the driven shaft 14ª and does rotate therewith at the same speed. The action of the eccentric blocks 15 and 15ª on the intermediate power transmission member 18 under such condition of the parts will be to rotate the intermediate power transmission member at the same speed as the drive shaft, inasmuch as the journal bearing 19ª can only rotate at the same speed as the driven shaft 14ª.

As has been explained, when the clutch is in neutral position with the journal bearing unclutched from the supporting frame and from the driven shaft, the drive shaft will run idly without transmitting any power through the driven shaft, but the journal bearing 19ª will be rotated. By providing brake mechanism for the journal bearing member, or suitable other mechanism for retarding and arresting its movement, the driven shaft will be rota'ed by the driving shaft at varying speeds in proportion to the speed of the journal bearing 19ª with a corresponding increase in leverage, and by stopping the journal bearing 19ª, the driven shaft will drive the driven shaft at one-fourth the speed with a corresponding increase in leverage, as has been heretofore described.

The power may be applied to the drive shaft through a pulley or gear wheel 33, or any other form of drive mechanism. By applying power to the shaft 14ª, the speed of the shaft 13ª will be correspondingly increased, but the leverage will be decreased as will be apparent. Power may also be transmitted from the element described as the journal bearing by stopping the driven shaft or at least retarding its rotation. The journal bearing under such conditions rotates in a reverse direction.

For obtaining a variable speed for the driven shaft, rotation of the journal bearing member 19ª, or other element intermediate the drive and driven shafts, relative to the drive shaft may be controlled by any suitable mechanism. It will be observed that when the journal bearing member 19ª is permitted to run idle, no power is transmitted from the drive shaft to the driven one, and, consequently, the driven shaft remains idle, although by retarding the rotation of the journal bearing member, power will be transmitted to the driven shaft, and its speed will be accelerated in proportion to the retardation of the journal bearing member, until rotation of the journal bearing member is fully arrested whereupon the driven shaft is rotated at one-fourth the speed of the drive shaft with a corresponding increase in leverage. If now the journal bearing member be rotated in the same direction as the drive shaft, the speed of the driven shaft will be increased proportionately as the speed of the journal bearing member is increased until finally the drive and driven shafts will rotate at equal speeds and may then be coupled together by the clutch mechanism to obtain the direct drive.

Simple means are illustrated for controlling the independent rotation of the journal bearing member, although such means are capable of considerable variation to obtain the same result. Conveniently, a brake 35 may be provided for applying a braking action on the journal bearing member 19ª, and by increasing the braking action, rotation of the journal bearing member may be slowed down and finally stopped, thereby bringing up the speed of the driven shaft from zero to a speed equal to one-fourth of the drive shaft. For rotating the journal bearing in the same direction as the drive shaft, any suitable drive mechanism may be employed, and, for convenience, a belt 36 is illustrated which may be driven from any suitable source of power. By releasing the brake, the journal bearing may be rotated in the same direction as the drive shaft and the speed of said journal bearing member may be increased until it equals that of the driven shaft, whereupon the journal bearing member and driven shaft may be coupled together to obtain a direct drive connection between the drive shaft and driven shaft.

The action of the eccentric blocks on the slideways for rotating the driven member has been explained. When the driven shaft is held stationary and the drive shaft is run idly, the intermediate power transmission member is rotated in the same manner, but inasmuch as the driven shaft is stationary, the intermediate power transmission member is caused to move bodily around the axis of the driven shaft, but in a direction opposite to that taken by the driven shaft, thereby carrying with it the journal bearing in which it is journaled. It is to be observed that the shafts with the eccentric blocks thereon are located within the confines of the slideways, and that by reason of the aforesaid arrangement of the eccentric blocks and the slideways, as many eccentric blocks and slideways may be employed as are found desirable or necessary. It is also to be observed that the axes of the drive and driven shafts and the intermediate power transmitting member, together with said drive shaft and the eccentric blocks thereon, the shaft spur area of the power transmitting member, with the eccentric blocks thereon, and the driven shaft are disposed within the lateral bounds of the radially extending unbroken slideways in said intermediate power transmitting member, and in the head of the driven shaft, whereby the slideways rotate outside a center or shaft area extending from end to end through the assembly whether said shaft and power transmission member are in rotation upon their respective axes or collectively upon the axes of the drive and driven shafts. In other words, the slideways do not cross said central shaft area at any time, and, therefore, said drive and driven shafts and intermediate power transmitting member may be mounted upon a central member or within an external housing or combination of said internal or external mountings at will.

I claim as new, and desire to secure by Letters Patent:

1. Power transmitting gearing comprising a drive shaft, a driven shaft in co-axial alignment therewith, an intermediate cylindrical power transmitting member into which said drive shaft extends and having on one side an unbroken radially extending slideway therein and on the other side an eccentric block, said power transmitting member being interposed between said drive and driven shafts, an eccentric block on the drive shaft running in the slideway in said power transmitting member and the eccentric block on said power transmitting member running in a radially extending unbroken slideway formed in a head on the driven shaft, and a rigid bearing member having a bearing for said power transmitting member which is eccentrically disposed with respect to the axes of the drive and driven shafts and also having bearings to mount said drive and driven shafts.

2. Power transmission gearing comprising a drive shaft and a driven shaft in co-axial alignment therewith, shaft bearings therefor, an intermediate power transmitting member interposed therebetween, an eccentric block on the drive shaft running in a radially extending unbroken slideway in said intermediate power transmitting member, an eccentric block on said intermediate power transmitting member running in a radially extending unbroken slideway in the driven shaft, a journal bearing for said intermediate power transmiting member disposed eccentrically with respect to the axis of the drive and driven shafts, said journal bearing being carried from said shaft bearings and rotatably mounted on an axis concentric with the axis of the drive and driven shafts and capable of rotation thereon, and means for holding said journal bearing stationary.

3. Power transmission gearing comprising a drive shaft and a driven shaft in co-axial alignment therewith, an intermediate power transmitting member interposed therebetween, an eccentric block on the drive shaft running in a radially extending unbroken slideway in said intermediate power transmitting member, an eccentric block on said intermediate power transmitting member running in a radially extending unbroken slideway in the driven shaft, a journal bearing for said intermediate power transmitting member disposed eccentrically with respect to the axis of the drive and driven shafts, said journal bearing being rotatably mounted on one of said aligned shafts on an axis concentric with the axis of the drive and driven shafts and capable of rotation thereon, and means for controlling the rotation of said journal bearing.

4. Power transmission gearing comprising a drive shaft and a driven shaft in co-axial alignment therewith, an intermediate power transmitting member interposed therebetween, an eccentric block on the drive shaft running in a radially extending unbroken slideway in said intermediate power transmitting member, an eccentric block on said intermediate power transmitting member running in a radially extending unbroken slideway in the driven shaft, a journal bearing for said intermediate power transmitting member disposed eccentrically with respect to the axis of the drive and driven shafts, said journal bearing being rotatably mounted on one of said aligned shafts on an axis concentric with the axis of the drive and driven shafts and capable of rotation thereon, and clutch mechanism for arresting rotation of the journal bearing.

5. Power transmission gearing comprising a drive shaft and a driven shaft in co-axial alignment therewith, an intermediate power transmitting member interposed therebetween, an eccentric block on the drive shaft running in a radially extending slideway in said intermediate power transmitting member, an eccentric block on said intermediate power transmitting member running in a radially extending slideway in the driven shaft, a journal bearing for said intermediate power transmitting member disposed eccentrically with respect to the axis of the drive and driven shafts, said journal bearing being rotatably mounted on an axis concentric with the axis of the drive and driven shafts and capable of rotation thereon, and clutch mechanism between said journal bearing and the driven shaft.

6. Power transmission gearing comprising a drive shaft and a driven shaft in co-axial alignment therewith, an intermediate power transmitting member interposed therebetween, an eccentric block on the drive shaft running in a radially extending slideway in said intermediate power transmitting member, an eccentric block on said intermediate power transmitting member running in a radially extending slideway in the driven shaft, a journal bearing for said intermediate power transmitting member disposed eccentrically with respect to the axis of the drive and driven shafts, said journal bearing being rotatably mounted on an axis concentric with the axis of the drive and driven shafts and capable of rotation thereon, mechanism for controlling the rotation of said journal bearing, and mechanism for connecting said journal bearing and the driven shaft.

7. Power transmission gearing comprising a drive shaft and a driven shaft in co-axial alignment therewith, an intermediate power transmitting member interposed therebetween, an eccentric block on the drive shaft running in a radially extending slideway in said intermediate power transmitting member, an eccentric block on said intermediate power transmitting member running in a radially extending slideway in the driven shaft, a journal bearing within which said intermediate power transmitting member is rotatably mounted, the axis of said journal bearing being disposed eccentrically with respect to the axis of the drive and driven shafts, said journal bearing being rotatably mounted on one of said aligned shafts on an axis concentric with the axis of the drive and driven shafts and capable of rotation thereon, and means for retarding rotation of one of the elements intermediate the drive and driven shafts.

8. Power transmission gearing comprising a drive shaft and a driven shaft in co-axial alignment therewith, an intermedate power transmitting member interposed therebetween, an eccentric block on the drive shaft running in a radially extending slideway in said intermediate power transmitting member, an eccentric block on said intermediate power transmitting member running in a radially extending slideway in the driven shaft, a journal bearing for said intermediate power transmitting member disposed eccentrically with respect to the axis of the drive and driven shafts, said journal bearing being rotatably mounted on an axis concentric with the axis of the drive and driven shafts and capable of rotation thereon, means for retarding the rotation of said journal bearing, means for accelerating rotation thereof, and means for coupling the drive shaft with the driven shaft to rotate in unison therewith.

9. Power transmission gearing comprising a drive shaft and a driven shaft in co-axial alignment therewith, an intermediate power transmitting member interposed therebetween, an eccentric block on the drive shaft running in a radially extending unbroken slideway in said intermediate power transmitting member, an eccentric block on said intermediate power transmitting member running in a radially extending unbroken slideway in the driven shaft, a journal bearing within which said intermediate power transmitting member is rotatably mounted, the axis of said journal bearing being disposed eccentrically with respect to the axis of the drive and driven shafts, and said journal bearing being rotatably mounted on one of said aligned shafts on an axis concentric with the axis of the drive and driven shaft and capable of rotation thereon, and means for controlling the speed of one of the elements intermediate the drive and driven shafts relative to the speed of the drive shaft.

10. Power transmission gearing comprising a drive and a driven shaft, shaft bearings therefor, an intermediate power transmitting member interposed between said shafts, eccentric blocks on the drive shaft running in transversely disposed radially extending unbroken slideways in the intermediate power transmitting member, eccentric blocks on said latter member running in transversely disposed radially extending unbroken slideways in said shaft, and a rigid journal bearing within which said intermediate power transmitting member is rotatably mounted, the axis of said journal bearing being disposed eccentrically with respect to the axis of the drive shaft.

11. Power transmitting gearing comprising a drive shaft, a driven shaft, an intermediate rotary power transmitting member interposed therebetween, power transmitting connections between said drive shaft and the power transmitting member, power transmitting connections between said power transmitting member and the driven shaft, a rigid rotary bearing member providing co-axial bearings to mount said drive and driven shafts in co-axial alignment and also providing an eccentrically disposed bearing to mount said intermediate power transmitting member upon an axis eccentrically disposed to the co-aligned axes of said drive and driven shafts.

12. The power transmission gearing defined in claim 11 characterized by the power transmitting connections between the drive shaft and the power transmitting member being in the form of angularly disposed eccentric blocks arranged in different planes on the drive shaft and working in angularly disposed radially extending slideways arranged in different planes in one side of the power transmitting member and the driving connections between the power transmitting member and the driven shaft being in the form of angularly disposed eccentric blocks arranged in different planes on the power transmitting member and working in angularly disposed radially extending slideways arranged in different planes in a head formed on the end of the driven shaft.

13. Power transmission gearing comprising in combination a drive shaft, a driven shaft in co-axial alignment therewith, an intermediate power transmitting member interposed therebetween and rotatably mounted upon an axis eccentrically disposed with respect to the axes of the drive and driven shafts, said intermediate power transmitting member having upon one side radially extending unbroken slideways disposed in different planes and angles and on the other side eccentric blocks disposed in different planes and angles, said drive shaft having thereon eccentric blocks disposed in different planes and angles relative to said radially extending slideways in the power transmitting member and disposed within said slideways and rotatable therein, said eccentric blocks upon said intermediate power transmitting member being disposed within radially extending unbroken slideways in a head on said driven shaft and rotatable in said slideways, the latter being disposed upon different planes and agles in relation to the eccentric blocks upon the power transmitting member, and the axes of said drive and driven shafts being continuously within the lateral bounds of all of said radially extending slideways.

14. Power transmission gearing comprising in combination a drive shaft, a driven shaft in co-axial alignment therewith, an intermediate power transmitting member interposed therebetween and rotatably mounted on an axis eccentrically disposed with respect to the co-aligned axes of the drive and driven shafts, said intermediate power transmitting member having upon one side radially extending unbroken slideways disposed in different planes and angles and on the other side a shaft spur area surrounded by eccentric blocks disposed in different planes and angles, said drive shaft having thereon eccentric blocks disposed in different planes and angles relative to the slideways in the power transmitting member and disposed within and rotatable therein and said shaft spur area of the power transmission member together with its eccentric blocks being disposed within and rotatable in radially extending slideways in a head on the driven shaft, the latter slideways being disposed in different planes and angles relative to the eccentric blocks of the power transmitting member, and the lateral bounds of the several slideways being continuously disposed outside a shaft area extending from end to end through the assembly.

15. Power transmission gearing comprising in combination a drive shaft, a driven shaft in co-axial alignment therewith, an intermediate power transmitting member interposed therebetween and rotatably mounted on an axis eccentrically disposed with respect to the co-aligned axes of the drive and driven shafts, and a rigid rotatable bearing member mounting said drive and driven shafts and said intermediate power transmitting member, said intermediate power transmitting member having upon one side radially extending unbroken slideways disposed in different planes and angles and on the other side a shaft spur area surrounded by eccentric blocks disposed in different planes and angles, said drive shaft having thereon eccentric blocks disposed in different planes and angles relative to the slideways in the power transmitting member and disposed within and rotatable therein and said shaft spur area of the power transmitting member together with its eccentric blocks being disposed within and rotatable in radially extending slideways in a head on the driven shaft, the latter slideways being disposed in different planes and angles relative to the eccentric blocks of the power transmitting member, and the lateral bounds of the several slideways being continuously disposed outside a shaft area extending from end to end through the assembly.

JOHN E. BATTS.